United States Patent [19]

Hayakawa et al.

[11] 4,430,379

[45] Feb. 7, 1984

[54] MASTER PLATE FOR DRY LITHOGRAPHIC PRINTING

[75] Inventors: Eizi Hayakawa, Utsunomiya; Akio Kojima, Urawa; Yoshi Arai, Oyama; Masatoshi Sakuma, Urawa; Yukichi Toyoshima, Tokyo, all of Japan

[73] Assignees: Dainippon Ink & Chemicals Inc., Tokyo; Kawamura Institute of Chemical Research, Saitami, both of Japan

[21] Appl. No.: 296,189

[22] Filed: Aug. 25, 1981

[30] Foreign Application Priority Data

Aug. 26, 1980 [JP] Japan ................................ 55-116392

[51] Int. Cl.[3] ........................... B32B 7/02; B41N 1/14

[52] U.S. Cl. .................................... 428/216; 101/453; 101/457; 428/421; 428/422; 428/425.5; 428/447; 428/448; 428/451; 428/908; 430/272; 430/273; 430/302; 430/496; 430/531

[58] Field of Search ..................... 101/450.1, 453, 457, 101/462; 428/195, 421, 422, 447, 448, 451, 908, 914, 215, 216, 423.1, 425.5; 430/272, 273, 302, 303, 496, 531

[56] References Cited

U.S. PATENT DOCUMENTS 3,910,187 10/1975 Cords ................................. 101/450
4,074,009 2/1978 Sanders ............................... 428/421
4,087,584 5/1978 Taniguchi et al. .................. 428/422
4,218,514 8/1980 Pacansky ............................ 428/447

*Primary Examiner*—Bruce H. Hess
*Attorney, Agent, or Firm*—Sherman & Shalloway

[57] ABSTRACT

In a master plate for dry lithographic printing comprising (1) a substrate and (3) an ink-repellent silicone layer formed thereon, the improvement wherein a toner anchoring layers (2) composed of a resin having compatibility with an image layer (5) to be superimposed on the silicone layer (3) during image making or a resin containing an active group capable of reacting with the image layer (5) during image making is formed between the substrate (1) and the silicone layer (3), and wherein the silicone layer (3) is composed of a silicone resin containing a fluorine-containing surface-active compound of the formula Rf—X—Y wherein Rf represents a fluorinated aliphatic radical having 3 to 12 carbon atoms, X represents a divalent linking group, and Y represents a hydrophilic group having a nitrogen-containing linking moiety or a phosphorus containing linking moiety.

6 Claims, 5 Drawing Figures

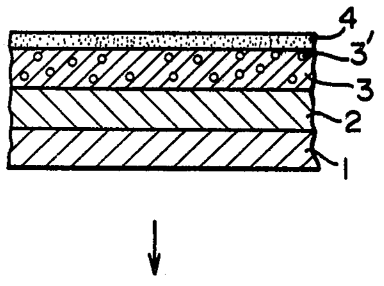
Fig. 1
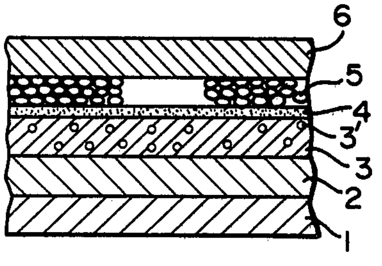
Fig. 2
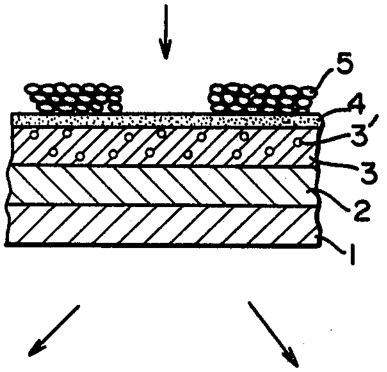
Fig. 3
Fig. 4
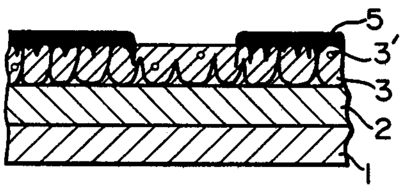
Fig. 5
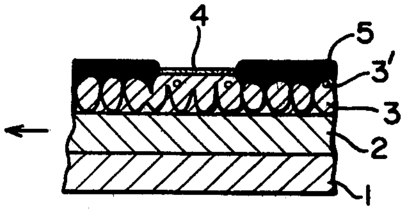

MASTER PLATE FOR DRY LITHOGRAPHIC PRINTING

This invention relates to a master plate for preparation of a lithographic printing plate which does not require dampening water in printing.

A lithographic printing plate called a dry offset plate which utilizes the excellent ink repellency of a silicone is known as the printing plate which does not require dampening water for printing. For example, Canadian Pat. No. 1,029,598 (corresponding to German Laid-Open Patent Publication No. 2,416,015) discloses a lithographic printing plate made by providing an ink-receptive portion on a silicone resin layer by an electrophotographic process. In such a lithographic printing plate, the adhesion between the toner image and the silicone resin layer is not sufficient, and a number of clear prints cannot be obtained.

U.S. Pat. No. 4,074,009 discloses a master plate comprised of a layer of polyvinyl chloride, an ethylene/vinyl acetate copolymer, etc. as an ink-receptive portion and an ink-repellent layer of a fluorine-containing compound formed on the surface of the polymer layer. The ink repellency of this master plate is by no means better than that of a master plate comprising a silicone resin layer.

It is an object of this invention therefore to provide a master plate for dry lithographic printing, which is free from the aforesaid defects.

Another object of this invention is to provide a master plate for dry lithographic printing, which can be imaged easily by utilizing an electrophotographic process.

The present inventors worked for many years on the improvement of the fixability of a toner without impairing the ink repellency of a silicone resin, and found that the fixability of a toner image is improved by including a specified fluorine-containing surface-active agent into a silicone resin. It has also been found that not only the fixability of a toner image but also its wetting characteristics and surface smoothness can be improved by providing between the substrate and the silicone resin layer containing the fluorine-containing surface-active compound a toner anchoring layer composed of a resin having high compatibility with a toner resin, or when the toner resin has a reactive group, a resin having a chemically reactive group capable of chemically combining with the toner.

Thus, according to this invention, there is provided a master plate for dry lithography comprising a substrate, a toner anchoring layer formed on the substrate and composed of a resin having compatibility with a toner image during heat fusion or a resin having a reactive group capable of chemically reacting with the toner during heat fusion, and an ink-repellent layer formed on the anchor layer and composed of a silicon resin, preferably a room temperature or low temperature curable silicone resin, containing a fluorine-containing surface active compound of the formula Rf—X—Y wherein Rf represents a fluorinated aliphatic radical having 3 to 12 carbon atoms, X represents a divalent linking radical such as $-(CH_2)_l-$ in which l is an integer of 1 to 6, —CO— or —$SO_2$—, and Y represents a hydrophilic radical having a nitrogen- or phosphorus-containing linking moiety.

The invention is described below in detail with reference to the accompanying drawings.

FIG. 1 is an enlarged partial sectional view schematically illustrating the structure of the master plate of the invention. The master plate has an anchor layer (2) between a substrate (1) and a silicone layer (3), and the anchor layer (2) is formed of a resin having compatibility with a toner image (5) to be superimposed on the master plate in image making or a resin having an active group capable of reacting with the toner image (5). The silicone layer (3) is composed of a silicone resin layer having the fluorine-containing surface-active compound (3') of the above formula dispersed or dissolved therein. On the surface of the silicone layer (3), a surface-oriented layer (4) of the fluorine-containing surface-active compound is formed because of the property of the surface-active compound.

FIGS. 2 to 5 are enlarged partial sectional views for schematically illustrating imaging of the master plate shown in FIG. 1 by an electrophotographic process.

FIG. 2 shows the state of direct superimposition on the master plate of a toner image (5) in the form of a letter, geometrical figure, symbol, or design pattern formed on an electrophotographic material or transfer base material (6). FIG. 3 shows the state of transfer of the toner image to the master plate by electrostatic transfer or press transfer. FIG. 4 shows the structure of the plate on which the toner image has been fused by heating. As a result of heating, the surface-oriented layer (4) dissipates to make the plate ready for printing.

Sometimes, a minor amount of the surface oriented layer (4) remains in non-image areas of the resulting lithographic plate even after the toner image (5) has been heat-fused. In such a case, the surface oriented layer may be removed by wiping the surface of the resulting plate with methanol or other polar solvents. Thus, the lithographic plate ready for printing shown in FIG. 4 is obtained.

The master plate of the invention is comprised of the substrate (1), the anchor layer (2), the ink-repellent silicone layer (3) containing the fluorine-containing surface-active compound (3') and the surface-oriented layer (4) of the fluorine-containing surface-active compound.

The substrate (1) may be made of any suitable material, but is preferably of high strength because it is used as a lithographic plate.

The anchor layer (2) serves to bond the toner image (5) firmly to the surface of the silicone resin and improve wetting of the surface of the silicone layer. It is necessary therefore that the resin which constitutes the anchor layer (2) be a resin having compatibility with the toner image (5) during heating, or a resin having an active group capable of chemically reacting with the toner image (5) during heating. Examples of resins normally used as toners include epoxy resins, saturated polyester resins, unsaturated polyester resins, polyamide resins, a styrene/butadiene resin, phenolic resins, a styrene/acrylic resin, a styrene/maleic anhydride resin, a xylene resin, a vinyl chloride/vinyl acetate copolymer, and silicone resins. These resins may be used singly or as a mixture.

Preferably, the resin for the anchor layer is a combination of the resin having compatibility with the toner resin during heating and the resin having active group capable of forming a chemical linkage during the heat fusion of the toner.

Examples of such active groups are amino, epoxy, unsaturated, hydroxyl, carboxyl, mercapto, isocyanate, blocked isocyanate, nitrile and imino groups. Resins having such active groups include, for example, epoxy resins, polyamide resins, urea resins, phenolic resins, a styrene/maleic anhydride copolymer, polyester resins, acrylic resins, methacrylic resins, a styrene/butadiene resin, polysulfide resins and blocked isocyanate resins, and mixtures of these.

Examples of preferred combinations of the anchor resin and the toner resin are shown below by the types of the active group contained in the anchor resin.

(1) Epoxy group

Anchor resin

Bisphenol-type epoxides, phenolic epoxides, polyglycol-type epoxides, diglycidyl esters of dimeric acid, glycidyl methacrylate, and polymers thereof.

Toner resin

Polyamide resins, urea resins, phenolic resins, a styrene/maleic anhydride resin, polysulfide resins, a vinyl chloride/vinyl acetate copolymer, and epoxy resins.

(2) Hydroxyl group

Anchor resin

Hydroxyl-containing acrylic and methacrylic copolymers, phenolic resins, urea resins, polyester resins, and polyvinyl alcohol.

Toner resin

Polyamide resins, epoxy resins, polyester resins, and polymerized resins containing acrylic or methacrylic acid.

(3) Unsaturated groups

Anchor resin

Unsaturated polyester resins, a butadiene-styrene resin, and a butadiene-nitrile resin.

Toner resin

Unsaturated polyester resins, a styrene resin, and acrylic resins.

(4) Carboxyl group

Anchor resin

A styrene/maleic anhydride resin, polyester resins, and polymerized resins containing acrylic or methacrylic acid.

Toner resin

Epoxy resins, polyester resins, and hydroxyl-containing acrylic or methacrylic copolymers.

(5) Mercapto group

Anchor resin

Polysulfide resins

Toner resin

Epoxy resins, phenolic resins, and acryl- or allyl-terminated polyester-polyurethane resins.

(6) Isocyanate group

Anchor resin

Blocked isocyanate resins obtained by blocking tolylene diisocyanate, 4,4'-diphenylmethane diisocyanate, hexamethylene diisocyanate and polymethylenephenyl isocyanate with phenol, oximes, etc.

Toner resin

Resins having active hydrogen such as polyester resins, polyamide resins, phenolic resins and epoxy resins.

(7) Amino group

Anchor resin

Polyamide resins

Toner resin

Epoxy resins

In forming the toner anchoring layer (2), at least one of the above-exemplified resins is mixed with a suitable solvent, and the solution is coated on the substrate (1) by means of a doctor blade, air knife coater, wire knife coater, etc. The amount of the coating solution is selected so as to form a layer having a thickness required to anchor a toner image sufficiently on the surface of the silicone resin, desirably to obtain a thick layer having a thickness of at least 0.1 micron upon drying. If required, the anchor layer (2) may be slightly cured by using a resin having a suitable active group in combination or adding a photosensitive resin so that it will not be attacked by the solvent of a silicone resin solution to be coated thereon subsequently.

Examples of the silicone resin forming the silicone layer (3) on the anchor layer (2) include resins having only a methyl-containing group on the polymer chain, such as dimethylpolysiloxane, rubbers containing both a methyl-containing group and a phenyl-containing group on the polymer chain, rubbers having a methyl group and a vinyl group on the polymer chain, rubbers containing a methyl group and fluorine on the polymer chain, and rubbers having phenyl and vinyl groups on the polymer chain. Preferred are low temperature or room temperature curable silicone resins having a methyl group in the side chain. Silicone rubbers (for example, YSR-3022 and YSR-7031 made by Toshiba Silicone Co., Ltd., and KS-705F, KS-770 and KS-709 made by Shinetsu Silicone Co., Ltd.) for release sheets used in pressure-sensitive adhesive sheets are most suitable.

In forming the silicone layer (3) and the surface-oriented layer (4) of the fluorine-containing surface-active compound, a silicone-curing catalyst such as an organotin compound, an organozinc compound, an organotitanium compound or an organic amine is added to the silicone resin, and the mixture was further mixed with a solution of the fluorine-containing surface-active compound with stirring. If required, a suitable solvent which does not attack the anchor layer, for example a hydrocarbon solvent such as hexane and n-heptane, is added. The resulting coating solution is coated by a doctor blade, wire coater, etc. and dried and cured at room temperature or at a low temperature.

Since the fluorine-containing surface-active compound (3') dissolved or dispersed in the silicone resin solution has high surface activity, a part of it is oriented on the surface of the silicone resin at the time of evaporation of the solvent to form the surface-oriented layer (4). The remaining fluorine-containing surface-active compound is dissolved or dispersed in the silicone resin to provide a passage for the permeation and diffusion of the toner during heating.

Surface-active compounds of the above formula in which Rf is a perfluoroalkyl radical having 3 to 12 carbon atoms are preferred. These compounds can be classified by the polar group of Y into (1) those having a nonionic group, (2) those having an anionic group, (3) those having a cationic group, and (4) those having amphoteric property attributed to a combination of (1), (2) and (3). Examples of these surface-active compounds are given below for the individual classes (in the following formulae, R represents a hydrogen atom or a $C_1$–$C_{12}$ aliphatic radical and R′ represents a $C_1$–$C_3$ aliphatic radical).

(1)

$(CH_2CH_2O)_nH$
Rf—X—N
$(CH_2CH_2O)_{n'}H$ (n and n′=0 or an integer of 1 to 20)

R
|
Rf—X—N—$(CH_2CH_2O)_nH$ (n is an integer of 1 to 20 when R is H, and 0 or an integer of 1 to 20 when R is a $C_1$–$C_{12}$ aliphatic radical)

OH
|
Rf—X—N—$CH_2CHCH_2$—N—$(CH_2CH_2O)_nH$ (n=0 or an integer of 1 to 12)

(2)

R
|
Rf—X—N—$CH_2COOK$

Rf—X—N—$(CH_2COOK)_2$

R
|
Rf—X—N—$CH_2SO_3Na$

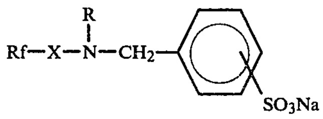

R
|
Rf—X—N—$CH_2OSO_3Na$

R O
| ||
Rf—X—N—$CH_2CH_2O$—P—$(OH)_2$

R O
| ||
Rf—X—N—$CH_2CH_2O$—(P—OH)½

(3)

R
|
Rf—X—N—$(CH_2)_3N^{\oplus}(R')_3.Hal^{\ominus}$ (4)

Rf—X—$N^{\ominus}$—$(CH_2)_3N^{\oplus}(R')_3$

-continued

Rf—X—N—$(CH_2)_2N^{\oplus}(R')_3$
|
$(CH_2)_3SO_3^{\ominus}$

R
|
Rf—X—N—$(CH_2)_3N^{\oplus}(R')_3$

R
|
Rf—X—N—$(CH_2)_3N^{\oplus}(R')^2$
|
$CH_2COO^{\ominus}$

The amount of the fluorine-containing surface-active compound is suitably 0.1 to 10% by weight, preferably 0.2 to 4% by weight, based on the weight of the silicone resin.

The amount of the silicone layer (3) coated differs depending upon the state of penetration and diffusion of the toner layer (5) and the anchor layer (2) as will be stated below, but is suitably from 0.1 micron to 50 microns, especially from 1 to 15 microns. If the thickness of the silicone layer (3) is less than 0.1 micron, the anchor layer penetrates to the surface of the silicone layer, and background smudging tends to occur. If, on the other hand, it is more than 50 microns, the fixability of a toner image is poor.

A xerographic process comprising transferring a toner image to a silicone-coated surface and a latent image transfer process comprising transferring a latent electrostatic image on an electrophotographic material to an ink-repellent layer, and developing it with a liquid or powder toner to form a toner image are examples of an electrophotographic imaging process which can be applied to the master plate of this invention.

The toner image (5) provided by the above electrophotographic imaging process should be composed of such a resin as is exemplified hereinabove in combination with the exemplified anchor layer resins.

As shown in FIG. 4, the toner image (5) and the anchor layer (2) penetrate and diffuse into the silicone resin by the action of the fluorine-containing surface-active compound during heat fusion. In this mechanism, the fluorine-containing surface-active compound shows a strong ability to reduce surface tension, which is its one useful action. At the time of heat fusion of the toner, a part of the surface-oriented layer of the fluorine-containing surface-active compound dissolves in the molten toner to reduce surface tension of the molten toner. As a result, the molten toner component penetrates and diffuses into the network structure of the cured silicone resin or the fluorine-containing surface-active compound dispersed or dissolved in the cured silicone resin. The anchor layer component also penetrates and diffuses into the silicone resin by the action of the fluorine-containing surface-active compound dissolved or dispersed in the cured silicone resin. Consequently, the anchor component contacts the toner component to induce a crosslinking reaction by which the toner image (5) is firmly fixed to the surface of the silicone resin and cannot easily drop off.

The molten toner image has a good property of wetting the silicone resin and good surface smoothness because the surface tension is reduced by the dissolving the fluorine-containing surface active compound and the penetrated anchor layer is present. Hence, the toner image can give a very clear print which is free from line narrowing (weakening) or discontinuity (blinding) spotted patterns on a solid surface, etc. By providing the anchor layer, the silicone resin is bonded strongly to the substrate, and therefore, has increased abrasion resistance. Moreover, the adhesion of the toner is high. Accordingly, the number of copies that can be printed from a single plate increases greatly. In order to produce such a penetrating effect to a greater extent, it is possible to intentionally add a low-molecular-weight resin component to the toner and the anchor layer.

Another useful action of the fluorine-containing surface-active compound is to decompose, volatilize or sublime at a temperature near the melting temperature of the toner, and to dissolve well in polar solvents.

Because of its chemical structure, the fluorine-containing surface-active compound decomposes, volatilizes or sublimes when heated to a temperature in the range of 80° to 200° C. For this reason, while the toner component penetrates into the cured silicone resin and is fixed there at a temperature at which the toner image as an ink-receptive portion melts, the surface-oriented layer (4) of the fluorine-containing surface-active compound on the surface of the silicone resin dissolves in the molten toner and gradually dissipates by decomposition, volatilization or sublimation to expose the surface of the silicone resin layer thereby providing an ink-repellent portion.

Furthermore, the fluorine-containing surface-active compound has very good solubility in polar solvents such as water, alcohols and ketones. Thus, by wiping off the master plate with a cloth or the like impregnated with a polar solvent which does not dissolve the silicone resin and the toner image after the fixation of the toner image, the surface-oriented layer (4) of the fluorine-containing surface active compound can be easily removed to reveal the ink-repellent silicone resin surface. When the surface-oriented layer of the fluorine-containing surface-active compound is not removed from the master plate, its ink repellency is poor. The removal of the surface-oriented layer makes the plate well ink-repellent and ready for printing.

The toner image can be melted, and the fluorine-containing surface-active compound can be dissipated, by conventional heat-fixing methods used in copying machines, for example by heating in a hot oven or with an infrared heater.

It will be understood from the foregoing statement that the present invention can be accomplished for the first time by adding the fluorine-containing surface-active compound to the silicone resin and providing the anchor layer between the silicone layer and the substrate.

The fluorine-containing surface active compound in accordance with this invention does not participate in an ink-repelling action as does the fluorine-containing compound described in the above-cited U.S. Pat. No. 4,074,009, but makes it easy for the resins of the toner and anchor layers to penetrate and diffuse through the silicone layer thereby achieving fixation of the toner to the anchor layer and the wetting of the silicone layer surface by the toner and the surface smoothness of the toner image.

The master plate of the invention can be imaged easily and makes it possible to produce clear line images on a material printed. Lithographic plates made therefrom have printing durability and can produce a number of prints. Since no dampening water is used, there is no trouble ascribable to dampening water (e.g., emulsification of ink), and a printing press of a simplified structure can be used.

The following non-limitation Examples illustrate the present invention further. All parts and percentages in these examples are by weight.

EXAMPLE 1

A resin solution (nonvolatile content 20%) for provision of an anchor layer was prepared in accordance with the following formulation.

| | |
|---|---|
| Polyamide-type resin (Lackamide 394-N; a tradename for a product of Dainippon Ink and Chemicals, Inc.) | 20 parts |
| Butanol | 40 parts |
| Xylene | 40 parts |

The resin solution was coated on a polyethylene-laminated paper to a dry film thickness of 5 microns, and dried at room temperature to form an anchor layer.

Sixty parts of a silicone resin solution of the following formulation

| | |
|---|---|
| Dimethylpolysiloxane (YSR-3022, a tradename for a paper releasing silicone resin made by Toshiba Silicone Co., Ltd.) | 10 parts |
| Curing catalyst composed mainly of an organotin compound (YC-6831, a tradename for a product of Toshiba Silicone Co., Ltd.; a curing catalyst for YSR-3022) | 0.4 part |
| Curing catalyst consisting mainly of a curing agent (YC-6919, a tradename for a product of Toshiba Silicone Co., Ltd.; a curing catalyst for YSR-3022) | 0.2 part |
| n-Heptane | 49.4 parts |

was mixed with stirring with 2.4 parts of a 5% methyl ethyl ketone solution of $C_8F_{17}SO_2N(CH_2CH_2OH)_2$ as a surface-active compound to prepare a coating solution. The solution was coated on the anchor layer to a dry film thickness of 5 microns and dried at room temperature for 24 hours.

A toner image was formed on the resulting master plate using a toner composed mainly of an epoxy resin by means of a dry electrophotographic copying machine (U-Bix 1500, a tradename for a product of Konishiroku Photographic Industry, Co., Ltd.), and heat-treated at 160° C. for 2 minutes to make a lithographic printing plate. The plate was then mounted on a small-sized offset printing press (A. B. Dick Model 326, a tradename for a product of A. B. Dick Co., Ltd.), and printing was performed without dampening water by using Driocolor Process Black N (a product of Dainippon Ink and Chemicals, Inc.). More than 5,000 copies of high quality were obtained.

The master plate showed no change in performance after six months, and could be imaged in the same way as above.

EXAMPLE 2

A master plate was prepared in the same way as in Example 1 except that a resin solution (nonvolatile content 20%) consisting of 33 parts of a blocked isocyanate resin (Burnock D-750, a trademark for a product of Dainippon Ink & Chemicals, Inc.) and 67 parts of ethyl acetate was used as the anchor resin solution. In the same way as in Example 1, a lithographic printing plate was made from it and printing was performed. As in Example 1, the adhesion of the toner and the ink-repellency were excellent, and the printing plate showed a printing durability of more than 5,000 copies.

EXAMPLE 3

A master plate was made in the same way as in Example 1 except that a resin solution (nonvolatile content 20%) composed of 20 parts of a natural resin-modified maleic acid resin (Beckacite P-720, a tradename for a product of Dainippon Ink & Chemicals, Inc.), 40 parts of isopropyl alcohol and 40 parts of xylene was used as the anchor layer resin solution. A lithographic printing plate was prepared and printing was performed in the same way as in Example 1. The ink repellency of non-image areas was good, and the lithographic printing plate could produce more than 4,000 copies.

EXAMPLE 4

An anchor resin layer solution (epoxy group/sulfide group equivalent ratio=1/2.7; nonvolatile content 20%) was prepared in accordance with the following formulation.

| | |
|---|---|
| Liquid epoxy resin (Epikote 828, a tradename for a product of Shell Chemical Co.) | 3 parts |
| Solid epoxy resin (Epikote 1001, a tradename for a product of Shell Chemical Co.) | 3 parts |
| Polysulfide resin (Thiokol LP-3, a tradename for a product of Toray Thiokol Co., Ltd.) | 14 parts |
| Toluene | 80 parts |

The resin solution was coated on art paper to a dry film thickness of 5 microns, and heated at 140° C. for 3 minutes to form a partially crosslinked anchor layer.

Sixty parts of a silicone resin solution having the following formulation

| | |
|---|---|
| Dimethylpolysiloxane (YSR-7031, a tradename for a paper releasing silicone resin made by Toshiba Silicone Co., Ltd.) | 10 parts |
| Curing catalyst composed mainly of platinum (YC-8610, a tradename for a product of Toshiba Silicone Co., Ltd.; a curing catalyst for YSR-7031) | 0.3 part |
| n-Heptane | 49.7 parts |

was mixed with 2.4 parts of a 5% methyl ethyl ketone solution of a surface-active compound of the following formula

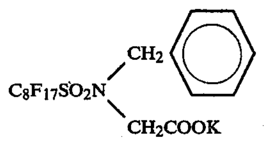

to form a coating solution. The resulting solution was coated on the anchor layer to a dry film thickness of 5 microns and dried at room temperature for 24 hours to form an ink-repellent silicone layer.

A toner image composed mainly of an epoxy resin was formed on the resulting master plate and fixed at 150° C. for 60 seconds by an infrared heat fixer to make a lithographic printing plate. The printing plate was subjected to a printing test in the same way as in Example 1. It had a printing durability of more than 5,000 copies, and the printed copies were clear with no background smudging.

EXAMPLE 5

| | |
|---|---|
| Epikote 1000 | 15 parts |
| Epikote 828 | 4 parts |
| Methyl ethyl ketone | 20 parts |
| Toluene | 60 parts |

An anchor resin solution (involatile content 20%) of the above formulation was coated on a polyethylene laminate paper to a dry film thickness of 5 microns, and dried at room temperature.

Sixty parts of a silicone resin solution composed of 10 parts of YSR-3022, 0.4 part of YC-6831, 0.2 part of YC-6919 and 49.4 parts of n-heptane was mixed with 1.2 parts of a 5% butyl Cellosolve solution of

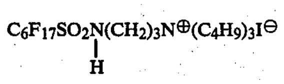

as a surface-active compound to form a coating solution. The resulting coating solution was coated on the anchor layer to a dry film thickness of 5 microns and dried at room temperature for 24 hours.

By means of a xerographic copying machine (U-Bix 101, a tradename for a product of Konishiroku Photographic Industry, Co., Ltd.), a transfer image was formed on the master plate by using a toner composed mainly of a polyamide resin and a toner composed mainly of a styrene/maleic anhydride resin, and thermally fixed at 160° C. for 1 minute. Thus, two lithographic printing plates were obtained.

Using each of the resulting printing plates, printing was performed in the same way as in Example 1. A clear printed image was obtained which was free from line discontinuity and had a good reproducibility of halftone dots. After producing 5,000 copies, the toner image on the surface of each printing plate remained adhering to the plate surface.

EXAMPLE 6

A master plate was made in the same way as in Example 1 except that 2.4 parts of a 2.5% butyl Cellosolve solution of $C_8F_{17}SO_2NH_2$ was used as the solution of a surface-active compound. When this master plate was used, the same good results as in Example 1 were obtained.

EXAMPLE 7

A master plate was produced, and a lithographic plate was prepared therefrom, in the same way as in Example 5 except that 2.4 parts of a 5% butyl carbitol solution of

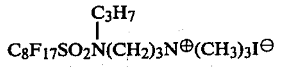

was used as the surface-active compound. The surface of the printing plate was uniformly wiped with a gauze impregnated with methanol, and dried by blowing air. The plate was then mounted on a lithographic printing plate, and printing was performed in the same way as in Example 5. Clear printed copies having excellent ink-repellency at the nonimage areas were obtained. After producing 6,000 copies, the toner image on the plate surface did not show any change such as peeling.

Comparative Example 1

A master plate was made in the same way as in Example 1 except that no anchor layer was provided and no surface-active compound was used. A lithographic printing plate obtained by forming a toner image on the resulting master plate scarcely caused background smudging of prints, but had no printing durability.

Comparative Example 2

The same procedure as in Example 1 was repeated except that the anchor layer was not provided. The coated product was stored at room temperature for 24 hours, and a toner image was formed in the same way as in Example 1. The resulting lithographic printing plate scarcely caused background smuding of printed copies. Slight line discontinuity, however, was seen in the toner image on the plate surface, and a repelling phenomenon by the silicone was noted on the solid area. After producing 2,000 printed copies, the image droped off from a part of the solid surface of the plate.

What we claim is:

1. In a master plate for dry lithographic printing comprising (1) a substrate and (3) an ink-repellent silicone layer formed thereon, the improvement wherein a toner anchoring layer (2) composed of a resin having compatibility with an image layer (5) to be superimposed on the silicone layer (3) during image making or a resin containing an active group capable of reacting with the image layer (5) during image making is formed between the substrate (1) and the silicone layer (3), and wherein the silicone layer (3) is composed of a silicone resin containing 0.1 to 10% by weight, based on the silicone resin, of a fluorine-containing surface-active compound of the formula Rf—X—Y wherein Rf represents a fluorinated aliphatic radical having 3 to 12 carbon atoms, X represents a divalent linking group selected from the group consisting of $-(CH_2)_l-$ in which l is an integer of 1 to 6, —CO— and $-SO_2-$, and Y represents a hydrophilic group having a nitrogen-containing linking moiety or a phosphorus containing linking moiety whereby a portion of said fluorine-containing surface active compound forms a surface-oriented layer (4) on the exposed surface of the silicone layer (3).

2. The master plate of claim 1 wherein the fluorine-containing surface-active compound contains a perfluoroalkyl radical as said fluorinated aliphatic radical.

3. The master plate of claim 1 wherein the resin forming the anchor layer (2) has at least one group selected from the class consisting of amino, epoxy, unsaturated, hydroxyl, carboxyl, aldehyde, mercapto, isocyanate, blocked isocyanate, nitrile and imino groups, as the active group capable of reacting with the image layer (5).

4. The master plate of any one of claims 1, 2 or 3 wherein the anchor layer (2) has a thickness of at least 0.1 micron, and the silicone layer (3) has a thickness of 0.1 to 50 microns.

5. The master plate of any one of claims 1, 2 or 3 wherein the silicone resin forming the silicone layer is dimethylpolysiloxane, the resin forming the anchor layer is an isocyanate resin having blocked or unblocked isocyanate groups, the fluorine-containing surface-active compound is a sulfonamide having a perfluoroalkyl radical with 5 to 10 carbon atoms and a lower hydroxyalkyl radical included in an amount of 0.2 to 4% by weight based on the silicone resin, the silicone layer has a thickness of 1 to 15 microns, and the anchor layer has a thickness of 1 to 10 microns.

6. A master plate for dry lithographic printing which comprises, in the following order, (1) a substrate, (2) a toner anchoring layer comprising a resin containing an active group capable of reacting with the resin of an image layer to be formed during image making, said active group containing resin being at least one resin selected from the group consisting of epoxy resins, polyamide resins, urea resins, phenolic resins, styrene/-maleic anhydride copolymer, polyester resins, polysulfide resins and isocyanate resins, said anchoring layer having a thickness of at least 0.1 micron, (3) an ink-repellant silicone layer which is a low temperature or room temperature curable silicone resin having a methyl group in the side chain, said silicone layer containing dissolved or dispersed therein from 0.1 to 10% by weight, based on the silicone resin, of a fluorine-containing surface-active compound selected from the group consisting of

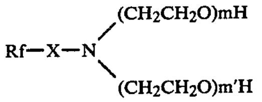

(m and m'=0 or an integer of 1 to 20)

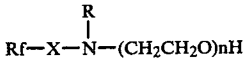

(n is an integer of 1 to 20 when R is H, and 0 or an integer of 1 to 20 when R is a $C_1$–$C_{12}$ aliphatic radical)

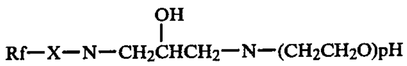

(p=0 or an integer of 1 to 12)

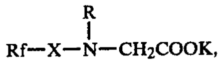

Rf—X—N—$(CH_2COOK)_2$

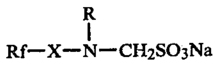

-continued

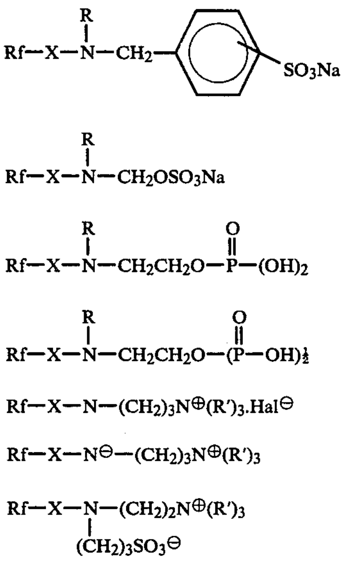

-continued

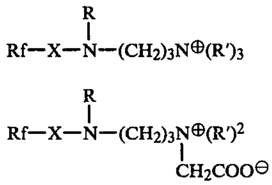

wherein Rf is a perfluoroalkyl radical having 3 to 12 carbon atoms, R represents a hydrogen atom or a $C_1$–$C_{12}$ aliphatic radical, R′ represents a $C_1$–$C_3$ aliphatic radical, and X represents a divalent linking group selected from the group consisting of $-(CH_2)-_l$ in which l is an integer of 1 to 6, —CO— and —$SO_2$—, said silicone layer (3) having a thickness of from 0.1 to 50 microns, and (4) a surface-oriented layer of said fluorine-containing surface-active compound, said surface-oriented layer being formed from a portion of the fluorine-containing surface-active compound from said silicone layer (3).

* * * * *

UNITED STATES PATENT AND TRADEMARK OFFICE

CERTIFICATE OF CORRECTION

PATENT NO. : 4,430,379

DATED : February 7, 1984

INVENTOR(S) : EIZI HAYAKAWA, ET AL.

It is certified that error appears in the above—identified patent and that said Letters Patent is hereby corrected as shown below:

Claim 3, line 4, after "mercapto" insert --unblocked--.

Signed and Sealed this

*Fourteenth* Day of *May 1985*

[SEAL]

*Attest:*

DONALD J. QUIGG

*Attesting Officer* *Acting Commissioner of Patents and Trademarks*